(12) United States Patent
Mckeen et al.

(10) Patent No.: US 9,189,411 B2
(45) Date of Patent: Nov. 17, 2015

(54) LOGGING IN SECURE ENCLAVES

(71) Applicants: Francis X. Mckeen, Portland, OR (US); Michael A. Goldsmith, Lake Oswego, OR (US); Barrey E. Huntley, Hillsboro, OR (US); Simon P. Johnson, Beaverton, OR (US); Rebekah Leslie, Portland, OR (US); Carlos V. Rozas, Portland, OR (US); Uday R. Savagaonkar, Portland, OR (US); Vincent R. Scarlata, Beaverton, OR (US); Vedvyas Shanbhogue, Austin, TX (US); Wesley H. Smith, Raleigh, NC (US)

(72) Inventors: Francis X. Mckeen, Portland, OR (US); Michael A. Goldsmith, Lake Oswego, OR (US); Barrey E. Huntley, Hillsboro, OR (US); Simon P. Johnson, Beaverton, OR (US); Rebekah Leslie, Portland, OR (US); Carlos V. Rozas, Portland, OR (US); Uday R. Savagaonkar, Portland, OR (US); Vincent R. Scarlata, Beaverton, OR (US); Vedvyas Shanbhogue, Austin, TX (US); Wesley H. Smith, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 13/729,348

(22) Filed: Dec. 28, 2012

(65) Prior Publication Data
US 2014/0189242 A1 Jul. 3, 2014

(51) Int. Cl.
G06F 12/00 (2006.01)
G06F 12/08 (2006.01)
G06F 12/14 (2006.01)

(52) U.S. Cl.
CPC .......... G06F 12/0875 (2013.01); G06F 12/145 (2013.01)

(58) Field of Classification Search
CPC ......................... G06F 12/084; G06F 12/0848
See application file for complete search history.

(56) References Cited

U.S. PATENT DOCUMENTS

| 2005/0100163 | A1 | 5/2005 | Buer |
| 2007/0277223 | A1 | 11/2007 | Datta et al. |
| 2010/0153784 | A1 | 6/2010 | Inoue et al. |
| 2012/0159184 | A1 | 6/2012 | Johnson et al. |
| 2012/0163589 | A1 | 6/2012 | Johnson et al. |

FOREIGN PATENT DOCUMENTS

| WO | 2010/057085 A2 | 6/2010 |
| WO | 2014/105160 A1 | 7/2014 |

OTHER PUBLICATIONS

International Search Report and Written Opinion received for PCT Patent Application No. PCT/US2013/047332, mailed on Oct. 28, 2013, 10 pages.
International Preliminary Report on Patentability received for PCT Patent Application No. PCT/US2013/047332, Mailed on Jul. 9, 2015, 7 pages.

*Primary Examiner* — Gurtej Bansal
(74) *Attorney, Agent, or Firm* — Thomas R. Lane

(57) ABSTRACT

Embodiments of an invention for logging in secure enclaves are disclosed. In one embodiment, a processor includes an instruction unit and an execution unit. The instruction unit is to receive an instruction having an associated enclave page cache address. The execution unit is to execute the instruction without causing a virtual machine exit, wherein execution of the instruction includes logging the instruction and the associated enclave page cache address.

20 Claims, 3 Drawing Sheets

METHOD 300

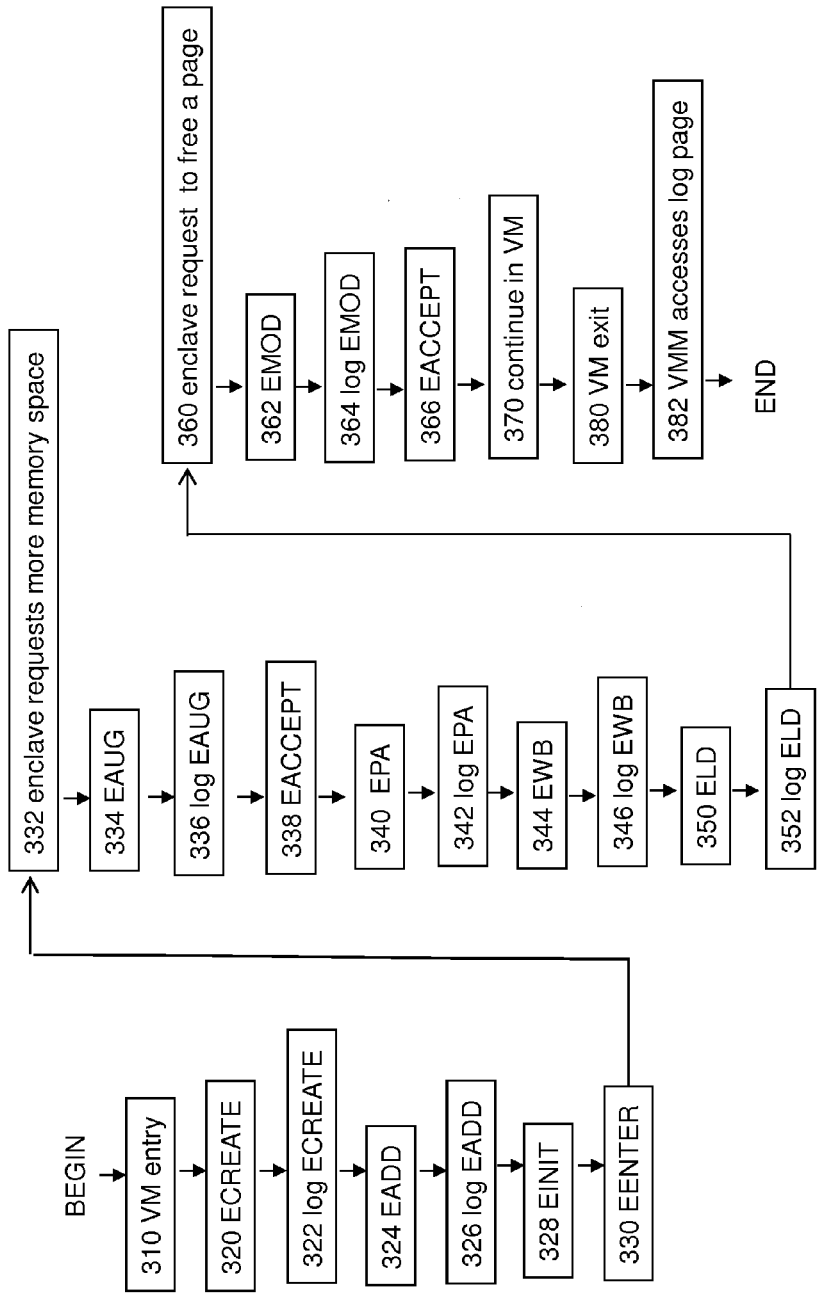

LOGGING IN SECURE ENCLAVES

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated partition or environment within an information processing system.

BRIEF DESCRIPTION OF THE FIGURES

The present invention is illustrated by way of example and not limitation in the accompanying figures.

FIG. 3 illustrates a method for logging in secure enclaves according to an embodiment of the present invention.

DETAILED DESCRIPTION

Figure 1:
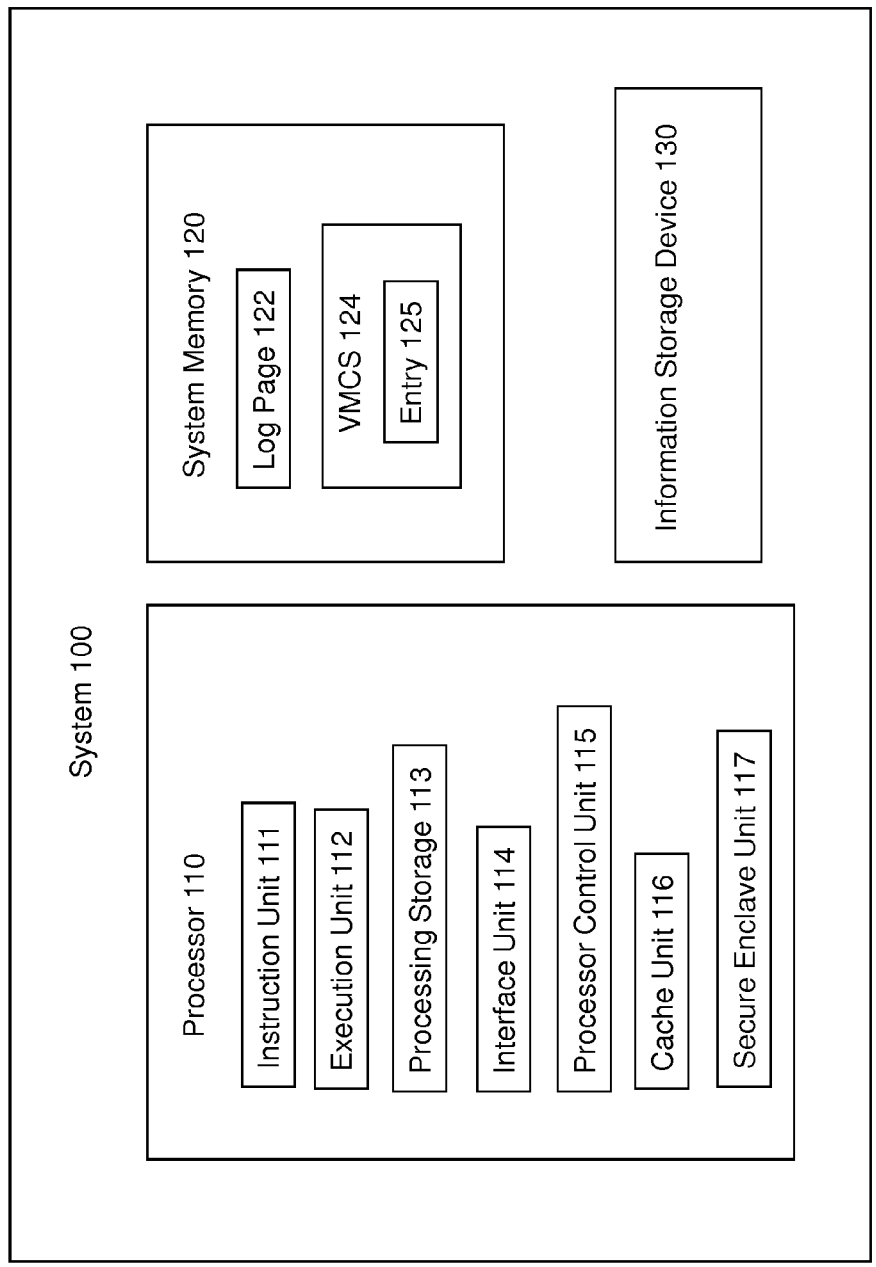
FIG. 1 illustrates a system including logging in secure enclaves according to an embodiment of the present invention.

Embodiments of an invention for logging in secure enclaves are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, various approaches to creating and maintaining a secured, protected, or isolated partition or environment within an information processing system have been developed. One such approach involves secure enclaves as described in the co-pending U.S. Patent Application entitled "Method and Apparatus to Provide Secure Application Execution," filed Jun. 19, 2012, Ser. No. 13/527,547, which is hereby incorporated by reference as an example of at least one embodiment of a secure enclave. However, the incorporated reference is not intended to limit the scope of embodiments of the invention in any way and other embodiments may be used while remaining within the spirit and scope of the invention.

FIG. 1 illustrates system 100, an information processing system including paging in secure enclaves according to an embodiment of the present invention. System 100 may represent any type of information processing system, such as a server, a desktop computer, a portable computer, a set-top box, a hand-held device, or an embedded control system. System 100 includes processor 110, system memory 120, and information storage device 130. Systems embodying the present invention may include any number of each of these components and any other components or other elements, such as information storage devices, peripherals, and input/output devices. Any or all of the components or other elements in this or any system embodiment, may be connected, coupled, or otherwise in communication with each other through any number of buses, point-to-point, or other wired or wireless interfaces or connections, unless specified otherwise.

System memory 120 may be dynamic random access memory or any other type of medium readable by processor 110. Information storage device 130 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage 113, interface unit 114, processor control unit 115, cache unit 116, and secure enclave unit 117. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or other hardware, such as an arithmetic unit, logic unit, floating point unit, shifter, etc., for processing data and executing instructions, micro-instructions, and/or micro-operations.

Processing storage 113 may represent any type of storage usable for any purpose within processor 110; for example, it may include any number of data registers, instruction registers, status registers, configuration registers, control registers, other programmable or hard-coded registers or register files, or any other storage structures.

Interface unit 114 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control unit 115 may include any logic, microcode, circuitry, or other hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Cache unit 116 may represent any one or more levels of cache memory in a memory hierarchy of information processing system 100, implemented in static random access memory or any other memory technology. Cache unit 116 may include any combination of cache memories dedicated to or shared among any one or more execution cores or processors within processor 110 according to any known approaches to caching in information processing systems.

Secure enclave unit 117 may represent any logic, circuitry, hardware, or other structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although embodiments of the present invention are not limited to those using a secure enclave as the secured, protected, or isolated environment. In one embodiment, a secure enclave may be created and maintained using instructions in the instruction set of a processor in the Intel® Core® Processor Family or other processor family from Intel® Corporation.

Figure 2:
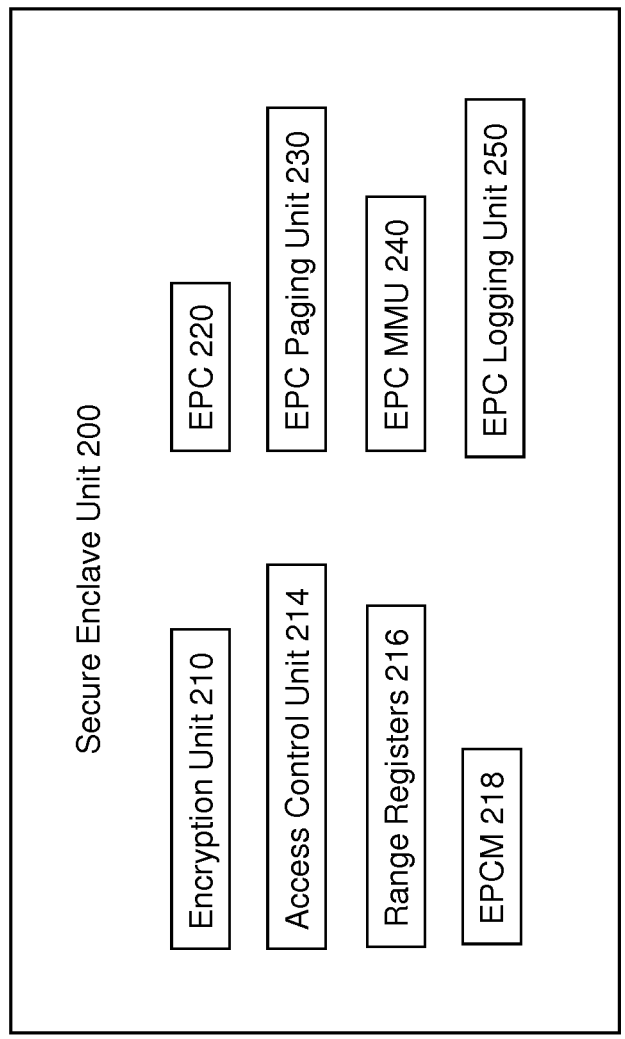
FIG. 2 illustrates a secure enclave unit according to an embodiment of the present invention.

FIG. 2 illustrates secure enclave unit 200, an embodiment of which may serve as secure enclave unit 117 in system 100. All or part of secure enclave unit 200 may be included within any one or more other units of processor 110, such as instruction unit 111, execution unit 112, processor storage 113, processor control unit 115, and cache unit 116.

Secure enclave unit 200 may include encryption unit 210, which may include any logic, circuitry, or other hardware to execute any one or more encryption algorithms and the corresponding decryption algorithms, and may include logic, circuitry, or other hardware shared with another encryption unit in processor 110.

Secure enclave unit 200 may also include enclave page cache (EPC) 220. In one embodiment, EPC 220 may be a dedicated portion of cache unit 116, such as a portion of a last level cache. Other embodiments are possible, including embodiments in which all or part of EPC 220 may be outside of processor 110. EPC 220 may be used to store unencrypted code and data for one or more secure enclaves. Access control logic 214, range register(s) 216, and EPC map (EPCM) 218 may be used to prevent access to a page within EPC 220 except by an application running on processor 110 within the secure enclave to which the page is allocated.

Secure enclave unit 200 may also include EPC paging unit 230. EPC paging unit 230 may include any logic, circuitry, or other hardware to provide for moving pages out of and into EPC 220 according to embodiments of the present invention. EPC paging unit 230 may include microcode, logic, circuitry, and/or other hardware to decode and execute an EWB instruction, an ELD instruction, and an EPA instruction.

These instructions may be used by an operating system or other software to manage EPC 220 and provide a virtual memory space for use by one or more secure enclaves that is larger than the size of EPC 220. An EWB instruction may be used to evict a page from EPC 220 to system memory 120. An ELD instruction may be used to load a page from system memory 120 into EPC 220. An EPA instruction may be used to allocate a special EPC page, called a version array page, on which to store version information for evicted pages.

Secure enclave unit 200 may also include EPC memory management unit (MMU) 240. EPC MMU 240 may include microcode, logic, circuitry, and/or other hardware to decode and execute an EADD instruction, an EAUG instruction, an EMOD instruction, an EACCEPT instruction, and an EREMOVE instruction. These instructions may be used by an operating system and/or other software dynamically increase and decrease the size of the memory space in EPC 220 allocated to one or more secure enclaves.

An EADD instruction is a privileged instruction that may be used by an operating system to allocate a page in EPC 220 to a secure enclave. Unlike the allocation of a page using an EAUG instruction, allocation of a page using an EADD instruction does not involve the acceptance of the allocation by the secure enclave using an EACCEPT instruction. An EAUG instruction is a privileged instruction that may be used by an operating system to allocate an unmeasured, zeroed page in EPC 220 to an existing secure enclave. An EMOD instruction is a privileged instruction that may be used by an operating system to modify the access rights or type associated with a previously allocated page in EPC 220. An EACCEPT instruction is an unprivileged instruction that may be used by an application inside a secure enclave to confirm changes made to the access rights or type of a page in EPC 220. An EREMOVE instruction is a privileged instruction that may be used by an operating system to de-allocate a page in EPC 220 from a secure enclave.

Secure enclave unit 200 may also include EPC logging unit 250. EPC logging unit 250 may include any microcode, logic, circuitry, or other hardware to provide for logging according to embodiments of the present invention. In one embodiment, the microcode or other control logic for certain instructions causes logging to be performed when the instruction is executed by guest software running in a virtual machine (VM), instead of causing a VM exit. The instructions for which logging is performed include instructions that are related to the creation of, memory management in, and paging in secure enclaves. For example, the instructions may include ECREATE, EADD, EREMOVE, EAUG, EMOD, ELD, EWB, and EPA. Therefore, embodiments of the present invention may provide for a virtual machine monitor (VMM) to monitor the memory management and paging activities of its guest software with improved performance gained by reducing the number of transfers of control between the guest and the VMM.

In one embodiment, logging is performed, for each instruction that references EPC 220, by writing certain information to a page (e.g., log page 122) in system memory 120. The address of log page 122 is specified in an entry (e.g., entry 125) in the VM control structure (e.g., VMCS 124) of the VM in which the guest is running, and log page 122 is accessible to the VMM. Therefore, the VMM may have a record of EPC references so it may later perform updates to its internal data structures based on the logged information rather than requiring a VM exit for each reference.

The information logged for each instruction may include the instruction (or leaf) and the EPC address associated with the instruction. Further information may be logged depending on the instruction. For example, for ECREATE, EADD, EAUG, EMOD, ELD, and EPA, the page type may be logged. For ECREATE, the state of the debug flag in the secure enclave control structure (SECS) may be logged. For EADD, EAUG, and ELD, the SECS host physical address (HPA) may be logged.

The information may be logged in any desired format on log page 122. For example, each log entry may be 128 bits, where the instruction, the EPC address, and the page type are stored in an instruction field, an EPC address field, and a page type field, respectively, in bits 63:0. Other instruction-dependent information (e.g., page type, debug flag, and SECS HPA) may be stored in one or more instruction-dependent fields in bits 127:64.

FIG. 3 illustrates method 300 for logging in secure enclaves according to an embodiment of the present invention. Although method embodiments of the invention are not limited in this respect, reference may be made to elements of FIGS. 1 and 2 to help describe the method embodiment of FIG. 3. Note that all of method 300 between and including blocks 320 and 370 may occur in a virtual machine without a VM exit.

In box 310, a VM entry is performed to transfer control of processor 110 from a VMM running outside a VM to a guest operating system running inside the VM.

In box 320, creation of a secure enclave in the virtual machine may begin, for example, by the guest operating system using an ECREATE instruction. In box 322, the ECREATE instruction, the associated EPC address, the page type, and the debug flag are logged. In box 324, pages in EPC 220 may be allocated to the secure enclave, for example, by the guest operating system using an EADD instruction. In box 326, the EADD instruction, the associated EPC address, the page type, and the SECS HPA are logged. In box 328, the secure enclave may be initiated, for example by the guest operating system using an EINIT instruction.

In box 330, a guest application may enter the secure enclave, for example by using an EENTER instruction. In box 332, the guest application in the secure enclave may request additional memory space in EPC 220. In box 334, the guest operating system may use and EAUG instruction to allocate a first page in EPC 220 to the guest application. In box 336, the EAUG instruction, the associated EPC address, the page type, and the SECS HPA are logged. In box 338, the guest application in the secure enclave may confirm the allocation using an EACCEPT instruction.

In box 340, the guest operating system may use an EPA instruction to allocate a second page in EPC 220 as a version array page. In box 342, the EPA instruction, the associated EPC address, and the page type are logged. In box 344, the guest operating system may use an EWB instruction to page a third page out of EPC 220. In box 346, the EWB instruction and the associated EPC address are logged.

In box 350, the guest operating system may use an ELD instruction to page a fourth page into EPC 220. In box 352, the ELD instruction, the associated page type, and the SECS HPA are logged.

In box 360, the guest application in the secure enclave may request the guest operating system to free a fifth page in EPC 220. In box 362, the guest operating system may use an EMOD instruction to de-allocate the fifth page from the guest application. In box 364, the EMOD instruction, the associated EPC address, and the page type are logged. In box 366, the guest application may use an EACCEPT instruction to confirm the allocation.

In box 370, the guest application may continue to execute in the secure enclave.

In box 380, control may be transferred to the VMM as the result of a VM exit. In box 382, the VMM may use the logged information to update its internal data structures.

In various embodiments of the present invention, the method illustrated in FIG. 3 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of method 300 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for logging in secure enclaves have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    an instruction unit to receive an instruction having an associated enclave page cache address; and
    an execution unit to execute the instruction without causing a virtual machine exit, wherein execution of the instruction includes logging the instruction and the associated enclave page cache address.

2. The processor of claim 1, wherein execution of the instruction also includes evicting a page from the enclave page cache.

3. The processor of claim 1, wherein execution of the instruction also includes creating a secure enclave.

4. The processor of claim 3, wherein execution of the instruction also includes logging an associated page type and a debug flag.

5. The processor of claim 1, wherein execution of the instruction also includes allocating a page in the enclave page cache to a secure enclave.

6. The processor of claim 5, wherein execution of the instruction also includes logging an associated page type and an address of a control structure for the secure enclave.

7. The processor of claim 1, wherein execution of the instruction also includes allocating a page in the enclave page cache as a version array page.

8. The processor of claim 7, wherein execution of the instruction also includes logging an associated page type.

9. The processor of claim 1, wherein execution of the instruction also includes loading a page into the enclave page cache.

10. The processor of claim 9, wherein execution of the instruction also includes logging an associated page type and an address of a control structure for a secure enclave.

11. The processor of claim 1, wherein execution of the instruction also includes de-allocating a page from a secure enclave.

12. The processor of claim 11, wherein execution of the instruction also includes logging an associated page type.

13. A method comprising:
    receiving an instruction from a guest operating within a virtual machine, the instruction having an associated enclave page cache address; and
    executing the instruction without causing an exit from the virtual machine, wherein execution of the instruction includes logging the instruction and the associated enclave page cache address.

14. The method of claim 13, wherein logging also includes logging an associated page type.

15. The method of claim 13, wherein logging also includes logging a debug flag.

16. The method of claim 13, wherein logging also includes logging an address of a control structure for a secure enclave.

17. The method of claim 13, wherein logging includes writing to a log page in memory, wherein the address of the log page is specified by an entry in a control structure for the virtual machine.

18. The method of claim 17, further comprising accessing, by a virtual machine monitor, the log page.

19. A system comprising:
    a memory; and
    a processor including
        an instruction unit to receive an instruction having an associated enclave page cache address; and
        an execution unit to execute the instruction without causing a virtual machine exit, wherein execution of the instruction includes logging the instruction and the associated enclave page cache address in the memory.

20. The system of claim 19, wherein logging includes writing to a log page in the memory, wherein the address of the log page is specified by an entry in a control structure for the virtual machine.

* * * * *